United States Patent
Bradley et al.

(10) Patent No.: US 12,335,560 B2
(45) Date of Patent: Jun. 17, 2025

(54) MEDIA CONTENT MONITORING

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 19 days.

(21) Appl. No.: 17/662,561

(22) Filed: May 9, 2022

(65) Prior Publication Data

US 2023/0362428 A1 Nov. 9, 2023

(51) Int. Cl.
*H04N 21/43* (2011.01)
*H04N 21/442* (2011.01)
*H04N 21/4722* (2011.01)

(52) U.S. Cl.
CPC ..... *H04N 21/43079* (2020.08); *H04N 21/442* (2013.01); *H04N 21/4722* (2013.01)

(58) Field of Classification Search
CPC ........... H04N 21/43079; H04N 21/442; H04N 21/4722
See application file for complete search history.

(56) References Cited

U.S. PATENT DOCUMENTS

| | | | |
|---|---|---|---|
| 10,341,742 B1* | 7/2019 | Kim | H04N 21/4122 |
| 2002/0183004 A1* | 12/2002 | Fulton | H04W 76/40 |
| | | | 455/41.1 |
| 2003/0054867 A1* | 3/2003 | Dowlat | H04M 19/041 |
| | | | 455/567 |
| 2017/0182283 A1* | 6/2017 | Palmateer | A61B 5/4812 |
| 2019/0200090 A1* | 6/2019 | Merced | H04N 21/4316 |

* cited by examiner

*Primary Examiner* — Nicholas T Corbo
(74) *Attorney, Agent, or Firm* — Guntin & Gust, PLC; Douglas Schnabel

(57) ABSTRACT

The disclosed technology is directed towards monitoring media content, including without presenting the monitored media content via a media presentation device, or while presenting in parallel. In general, supplementary data describing the monitored media content is obtained, e.g., generated by a media server based on the content being monitored. The supplementary data is presented via a user interface for a user to monitor, e.g., as displayed text, documents, audio in or other ways such as a combination of text and images. The user interface can be a primary presentation device the user is using, and/or another user device. The supplementary data can describe scenes of video, and/or transcriptions of audio, for example. The supplementary data can be interacted with, such as to switch to present the monitored media content or a selected portion thereof. Multiple media content presentations can be monitored, with supplementary data available for each.

8 Claims, 15 Drawing Sheets

MEDIA CONTENT MONITORING

TECHNICAL FIELD

The subject application relates to the presentation of media in general, and more particularly to monitoring the content of media, and related embodiments.

BACKGROUND

Contemporary users of media are often not able to fully consume media content, such as due to other distractions, or when there are two or more media content presentations occurring at the same time, and/or the like. As a result, a user often misses significant portions of presented media content, yet replay may not be desirable or practical. Further, a user may not want to replay some of the less significant portions that were missed.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
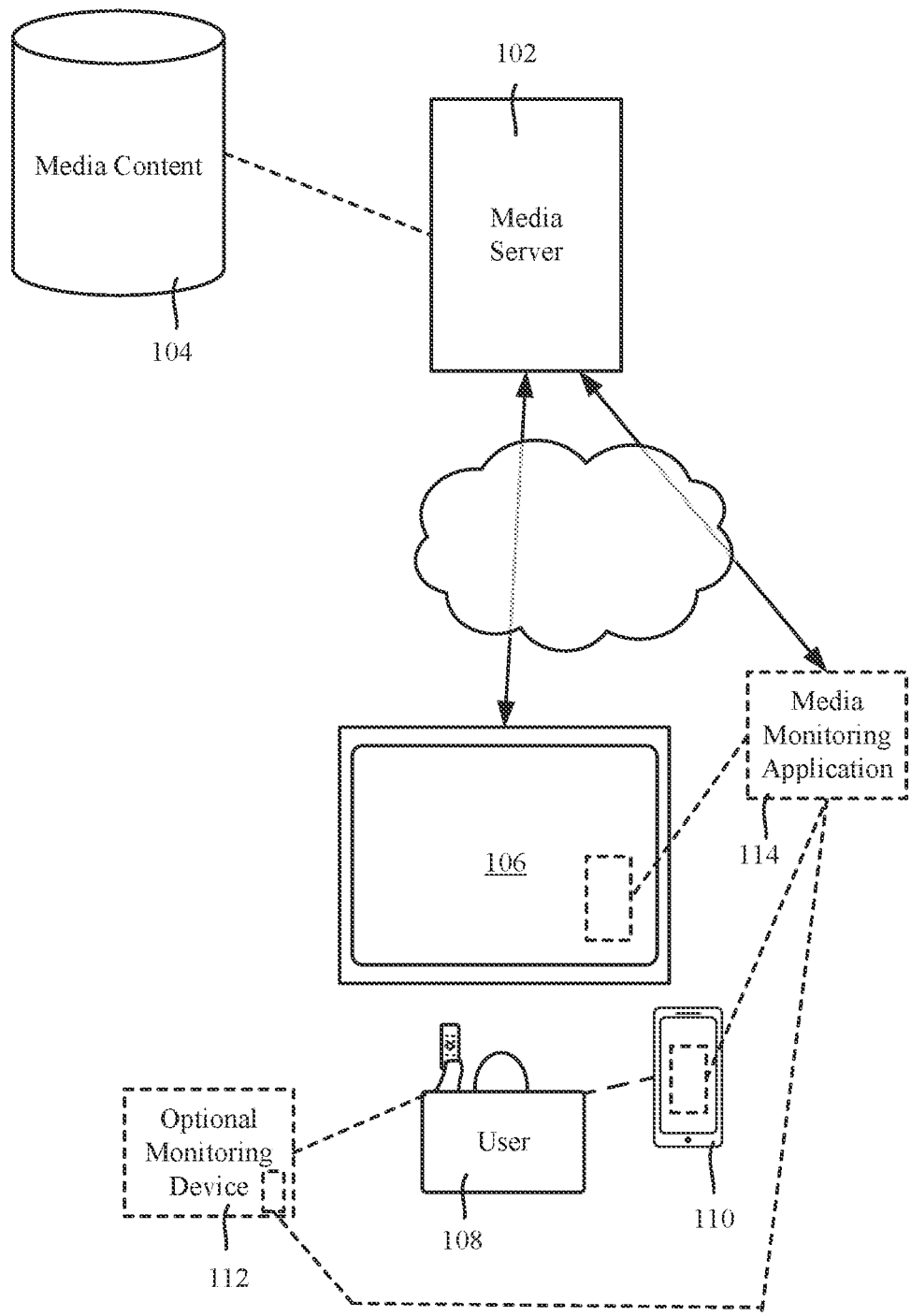
FIG. 1 is a block diagram of an example system for monitoring media content, in accordance with various aspects and embodiments of the subject disclosure.

The technology described herein is generally directed towards allowing a user to monitor the content of media while it is being presented, yet without fully consuming the content. In general, this enables the user to accomplish other tasks (including experiencing a different media content being presented). As will be understood, technology described herein allows the user to begin or resume consumption of the media presentation when desired, and/or when the context of the content is such that it becomes a priority for the user to engage in consumption of it.

The media may include live or recorded audio, video, gaming content, virtual reality content, online meetings, Internet browsing content, and other digital media capable of being presented to the user. An exemplary embodiment is presented in this disclosure of a user viewing video content, such as video streaming. However, the solution presented may be applied to other types of media as well.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3 GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a media server 102 (which can be of a service comprising multiple servers) that provides primary media content from a suitable media content data store 104 to a media presentation device 106 of a user 108. In general, the media server(s) 102 have access to media content, whereby the media server 102 may be engaged by the user 108 to stream video or other media to the media presentation device 10, which can be a display device and/or speaker(s). The media content may be provided by the media server 102, such as retrieved on request of the user, e.g., on demand or on some schedule. The media content may include, but is not limited to, audio, video, graphics, images, extended reality content, virtual reality content, augmented reality content, gaming content, Internet browsing content, and/or other digital media that can be presented to the user. The media content may be created as a file that can be downloaded to the user's devices, or may be streamed, without necessarily being a complete file.

In this way, one or more users may be viewing a primary media content presentation on the media display/presentation device 106. Each user, e.g., the user 108 as depicted, may be equipped with a wireless communication device such as a smart phone 110. Further, the user 108 may be equipped with one or more biometric monitoring devices 112 such as a fitness tracker, a smart watch, and/or other such device. The monitoring devices may be equipped with biometric monitoring capabilities such as breathing, heart rate, microphones and other sensors that may detect the user's biometric state.

The communication devices 110 and/or 112 may be equipped with an instance of a media monitor application program 114. As shown in FIG. 1, another instance of the media monitor application program 114 may be incorporated into the presentation device 106; indeed, via any media monitor application program instance 114, the technology described herein can operate independent of the communication devices 110 and/or 112.

To monitor a media content presentation, monitor supplementary data (or simply supplementary data) is created or otherwise obtained based on media content being monitored. This can be performed by the server 102 in this example. The supplementary data may, for example, be constructed based on closed captioning content or other transcribed content that is made available by the server 102.

Figure 2:
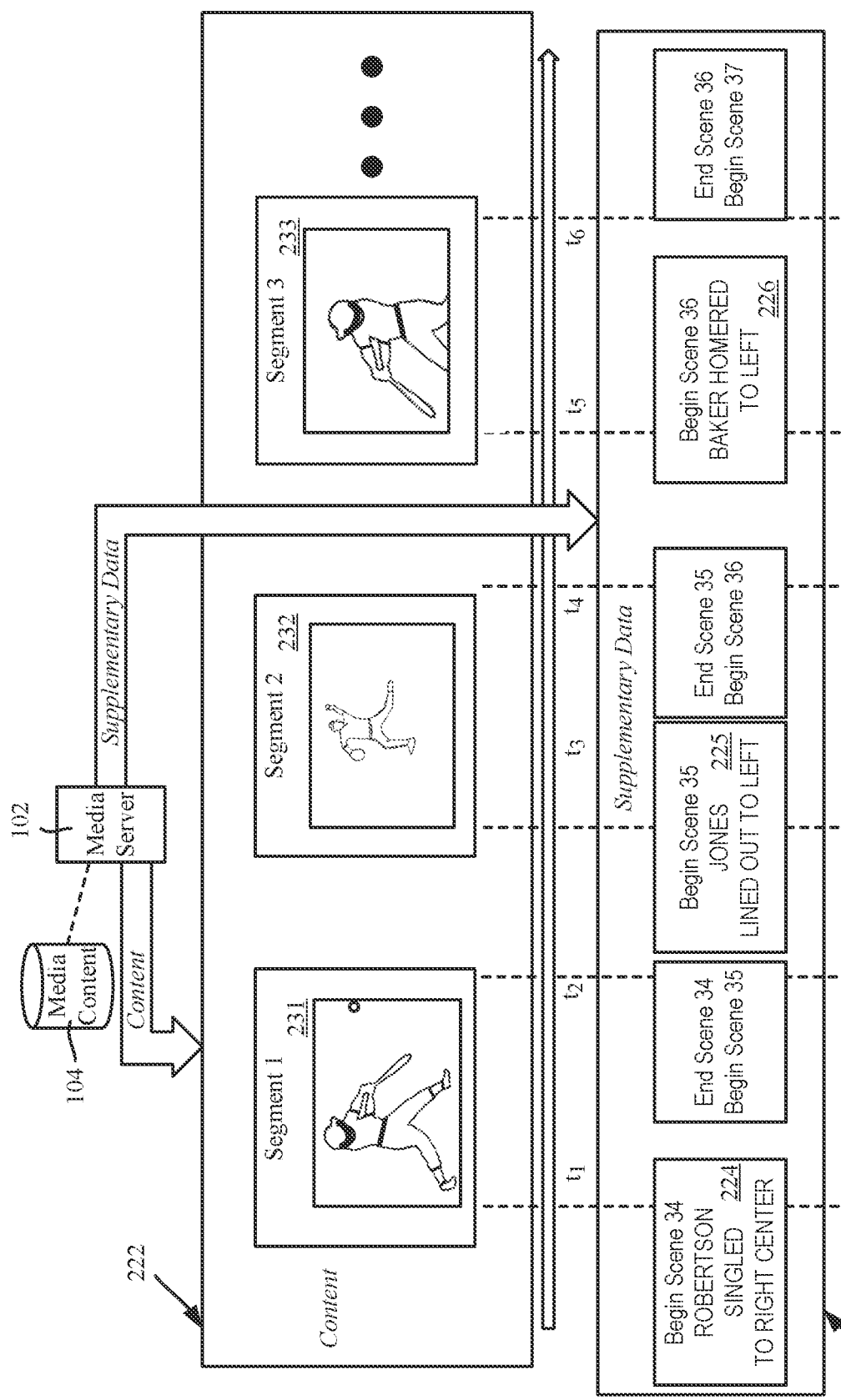
FIG. 2 is an example representation of providing monitor supplementary data describing media content including video being monitored, in accordance with various aspects and embodiments of the subject disclosure.

As shown in FIG. 2, in this way, during the presentation of media, the media server 102 may provide supplementary data 220 that is descriptive of the media content 222 being monitored. In the example of FIG. 2, the supplementary data 220 includes summaries 224-226 of scenes 231-233, that is, segments of time, within the media. Note that the media being monitored may or may not be displayed to the user. The summaries 224-226 may be descriptive titles/text of what is transpiring or has transpired during the scenes 231-233. In any event, the supplementary data 220 is available for streaming to the user device(s), including in parallel with a user's consumption of primary media, if any, as described herein.

Figure 3:
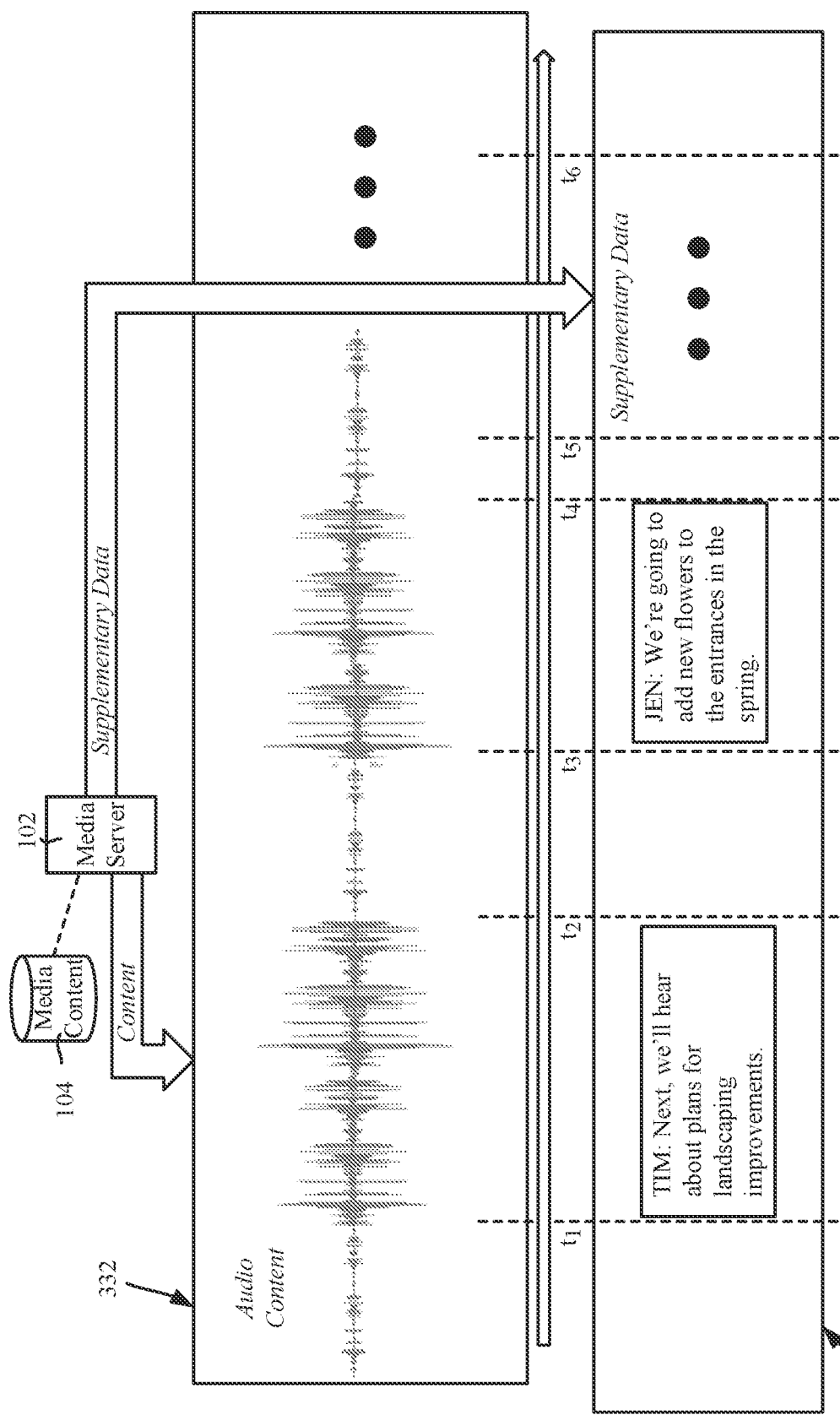
FIG. 3 is an example representation of providing monitor supplementary data describing media content including audio being monitored, in accordance with various aspects and embodiments of the subject disclosure.

In another example, as generally represented in FIG. 3, supplementary data 330 may be transcriptions of spoken audio that makes up the media content 332 that may be delivered to the user. For instance, if the media itself is audio in type, the supplementary data may be output in the form a running transcription in text format that is created using (e.g., timestamped) speech-to-text.

Figure 4:
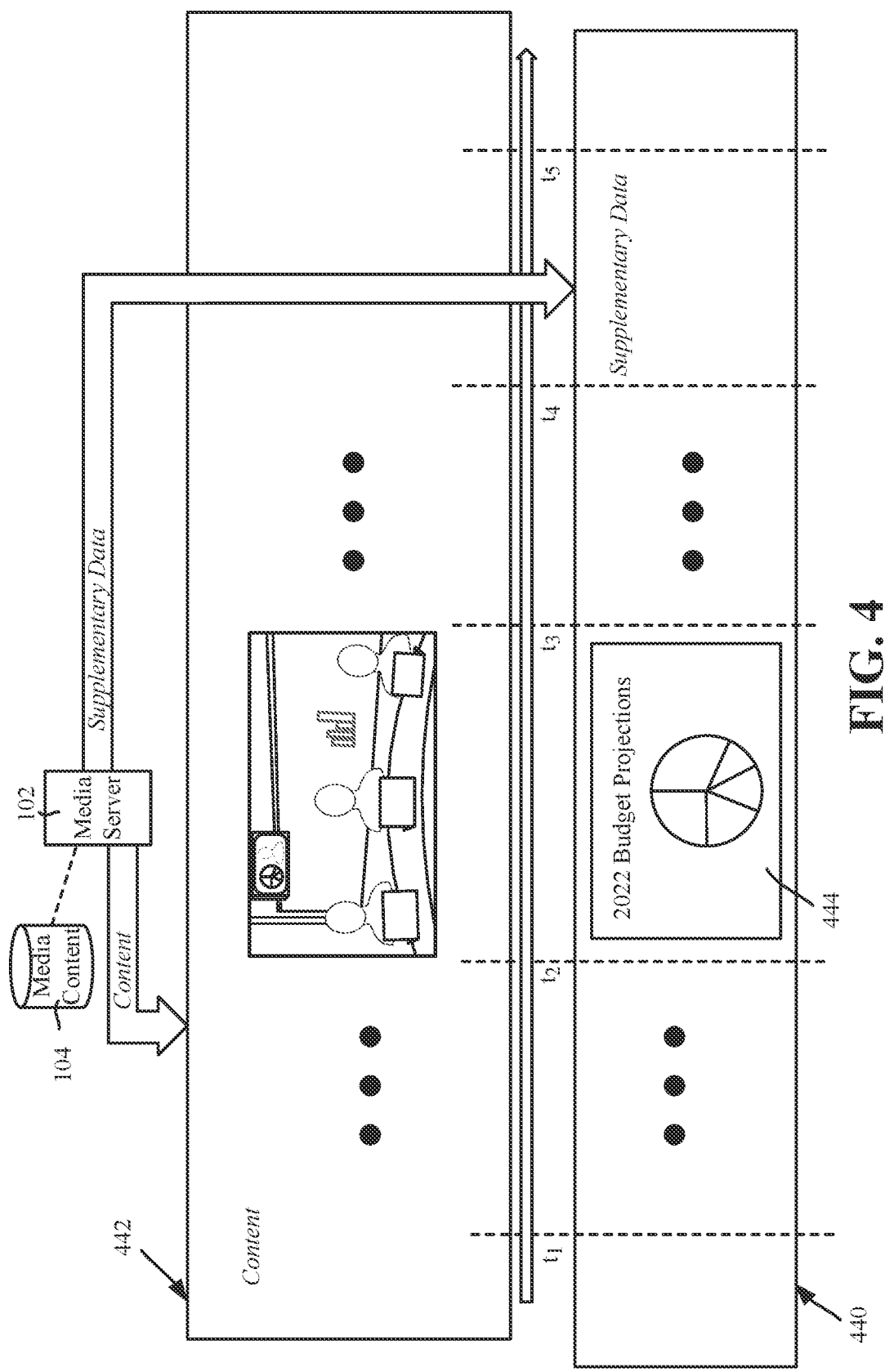
FIG. 4 is an example representation of providing monitor supplementary data describing media content including meting video being monitored, in accordance with various aspects and embodiments of the subject disclosure.

The supplementary data may also include or be based on other types of presentable data. For instance, as shown in FIG. 4, an image or file that is associated with the content in the media server 102 may serve as supplementary data 440. In the example shown, if the media is a virtual reality meeting, a file or graphic 444 that is presented during the virtual reality meeting may exist in the media content data store 104 and may be identified by the media server 102 as supplementary data, e.g., in a timestamped manner.

Figure 5:
FIG. 5 is an example representation of an interface for selecting among available media content to monitor, in accordance with various aspects and embodiments of the subject disclosure.

The user may consume primary media content in a normal fashion via a request from their media display device to a media server, such as a request for delivery of streaming video of a baseball game. As shown in FIG. 5, the user may switch to a different presentation of media content 550 (e.g., "BREAKING NEWS") on the media presentation device 106. In doing so, the user may be presented with an option (in interactive interface 552) of one or more other media streams that are available to monitor while consuming the new media stream 550. This prompt or the like may be presented in response to a message from the media server 102 to the media presentation device 106.

The media server 102 may maintain a profile for the user that tracks the media stream(s) to which the user has subscribed. In the example shown, for instance, the user may monitor homeowner's association (HOA) meetings, budget meetings at their place of work, and other types and sources of media. In the example shown, the user also has the option to monitor the baseball game having been previously presented while continuing to watch the new stream 550 of video.

Figure 6:
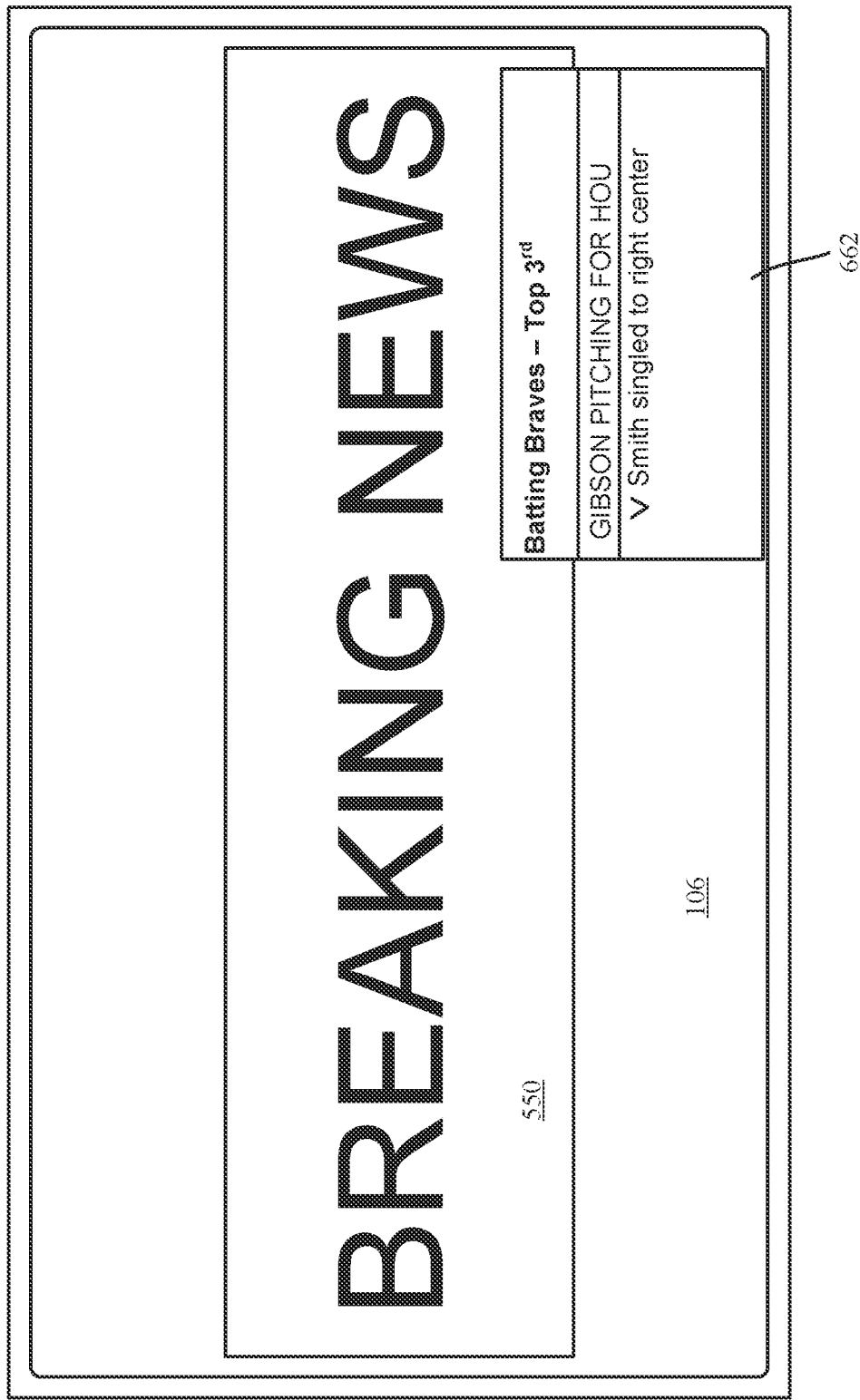
FIG. 6 is an example representation of an interface for outputting supplementary data representing selected media content being monitored, in accordance with various aspects and embodiments of the subject disclosure.

In the example of FIG. 6, the user has selected to monitor the baseball game, e.g., on the same presentation device 106, such as via interaction with the interactive interface 552 of FIG. 5. In this monitor mode, the new stream of video 550 is consumed as the primary source and the selected supplementary data for the monitored media is presented in some way, e.g., via descriptive text output in the visible interface 662. As time progresses, additional supplementary data may be scrolled on to the display (e.g., at the interface 662), as shown in FIG. 7, so that the user may continually monitor the supplementary data for the monitored media being monitored while continuing to watch the primary stream 550.

Figure 7:
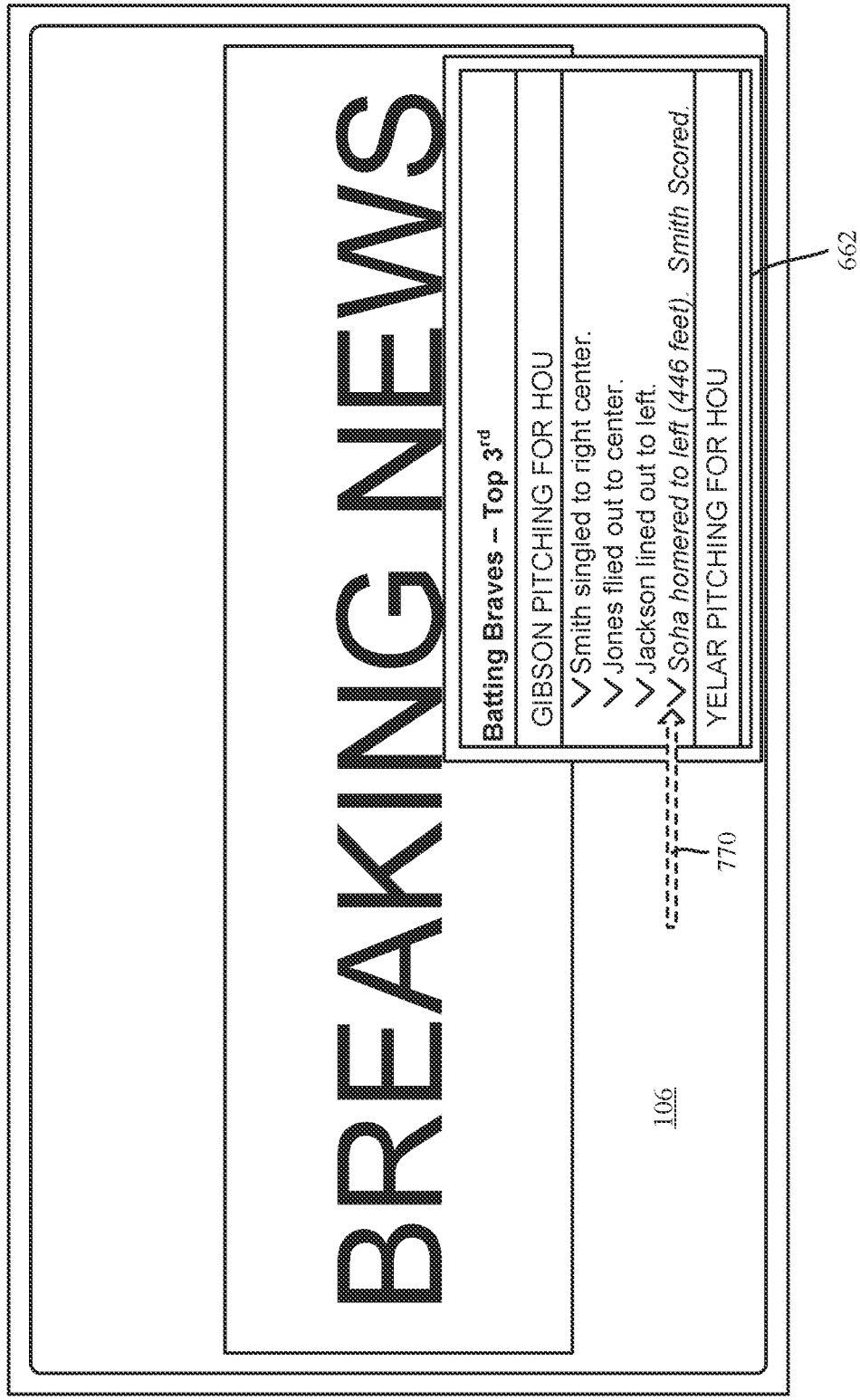
FIG. 7 is an example representation of an interface for outputting supplementary data representing selected media content being monitored, in which interaction to select part of the supplementary data can occur, in accordance with various aspects and embodiments of the subject disclosure.

In the example of FIG. 7, as generally represented via the dashed arrow 770. If the user, while watching the new primary media, identifies supplementary data of interest, the user may interact with the interface 622 to select to switch to the media associated with the supplementary data. In one example, the user may switch to the live feed of the media associated with the supplementary data.

Figure 8:
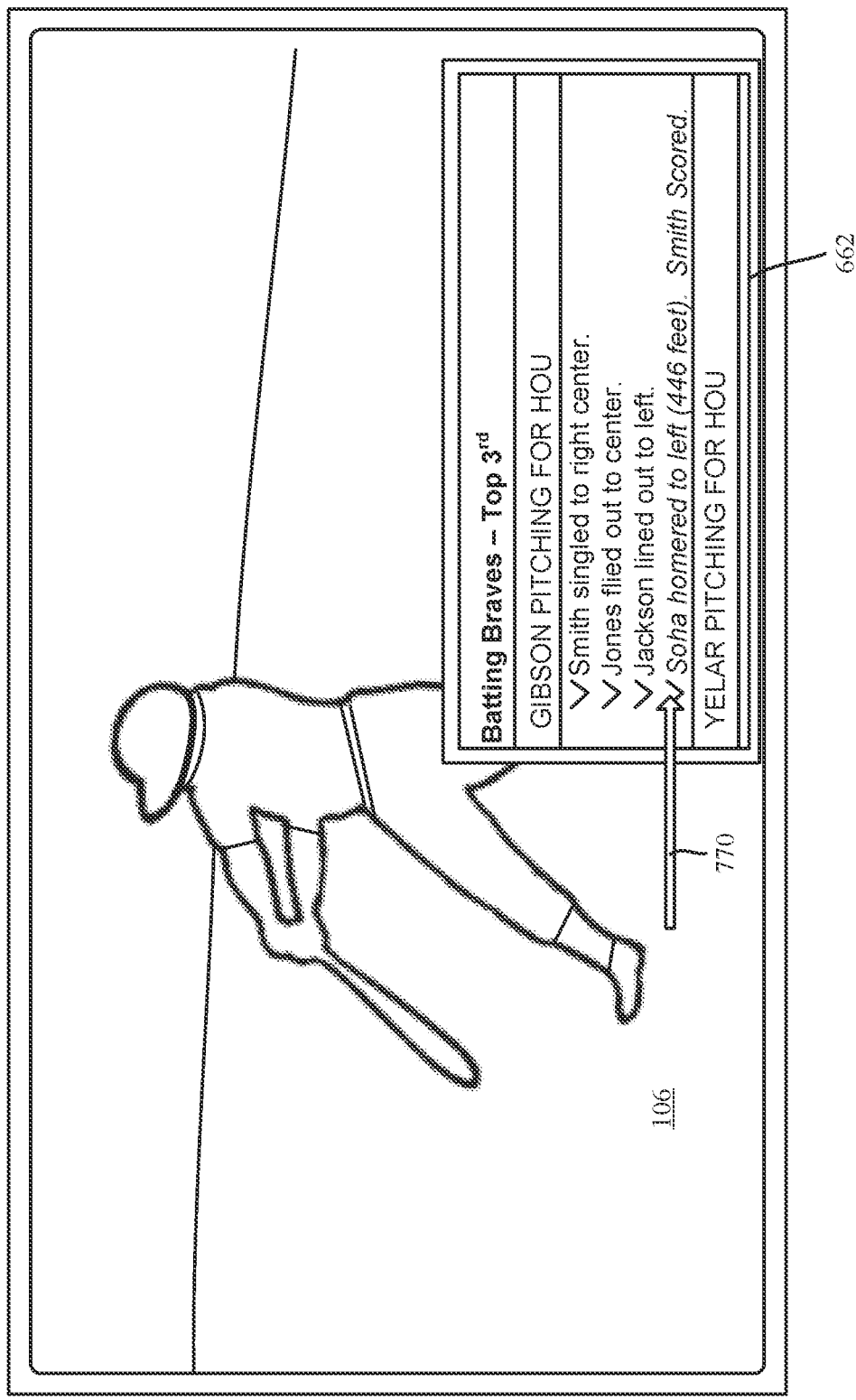
FIG. 8 is an example representation of monitoring multiple media content presentations, in accordance with various aspects and embodiments of the subject disclosure.

Alternatively, the user may select a timestamp/portion of content from the supplementary data interface 622 to which to switch by selecting a specific item within the supplemental data. In the case represented via the dashed arrow 770, for instance, as shown in FIG. 8 the user may select to return to the baseball game at the point of the home run as shown.

Figure 9:
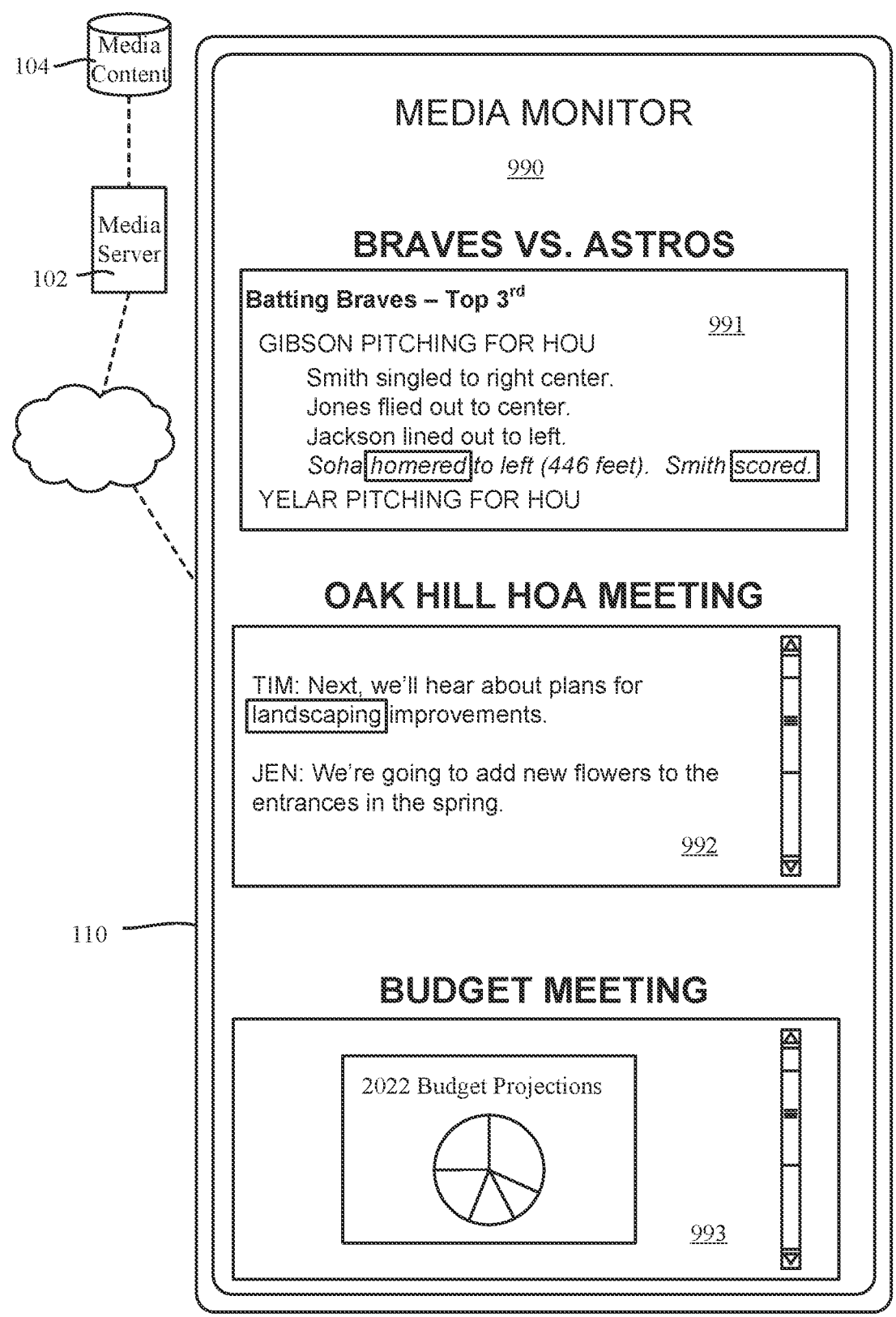
FIG. 9 is an example representation of outputting supplementary data of a monitored media content presentation in the form of audio, in accordance with various aspects and embodiments of the subject disclosure.

As generally represented in FIG. 9, the user may use an alternate media monitor screen 990 as a media monitor device, e.g., of the device 110 (as in FIG. 1). The user may register the address of this device 110 in their profile in the media server 102. In doing so, the user may monitor the supplementary data on the alternate screen 990, including (in this example) multiple sets 991-993 of supplementary data, including if and while continuing to watch another stream on their primary media display, if desired. It is noted, however, that the user need not be required to have a primary media stream or primary media device that is active. The user may use the media monitor screen 990 as shown as a standalone means for monitoring content across one or more media streams of interest.

As also shown in the example of FIG. 9, the user may specify specific one or more relevance criteria, e.g., within their profile data at the server 102 (or within the device application 114 (FIG. 1)) that may serve as triggers for monitoring of the media streams. For example, the user may specify in their profile data a setting such as specific events or topics or speakers or other identifiable context within the media. In one case, the user may only wish to begin monitoring a homeowners meeting if the topic of "landscaping" comes up. The user may therefore store "landscaping" as a setting preference, and the monitored stream may not need to appear to the user until it is determined by the media server 102 that landscaping has come up as a topic. In this manner, the server 102 or media monitor program may be monitoring the supplementary data, but only presents it to the user when it becomes pertinent/relevant. The system monitoring thus can be passive, in the background, or actively being presented to the user.

As also generally represented in FIG. 9 via the rectangles highlighting "homered" and "scored" in the supplementary data 991, and "landscaping" in the supplementary data 992, the user interface for the media monitor display 990 may further highlight preferences that match the content of the media being monitored. Although rectangles are one example, this may be done in a number of ways, such as color-coded highlighting that emphasize the context of interest as stored in the user's profile data. Higher priority relevance data may be specified by the user, which may result in a different type of highlighting relative to other matched relevance data.

Note that if specified, automatic switching can occur based on matched relevance data. For example, instead of or in addition to user selection as in FIGS. 7 and 8, the term "homered" can be specified as an automatic return to primary content presentation if and when matched.

Further, for monitored media content that is not live, but for example recorded or otherwise delayed, it is possible to prompt/alert the user of relevant upcoming content. For example, a user may be otherwise generally occupied while monitoring a replay of a business meeting. The user can be notified to switch to the video of the meeting replay within a countdown time or the like because the part for which the user has registered as being of interest is upcoming shortly.

Figure 10:
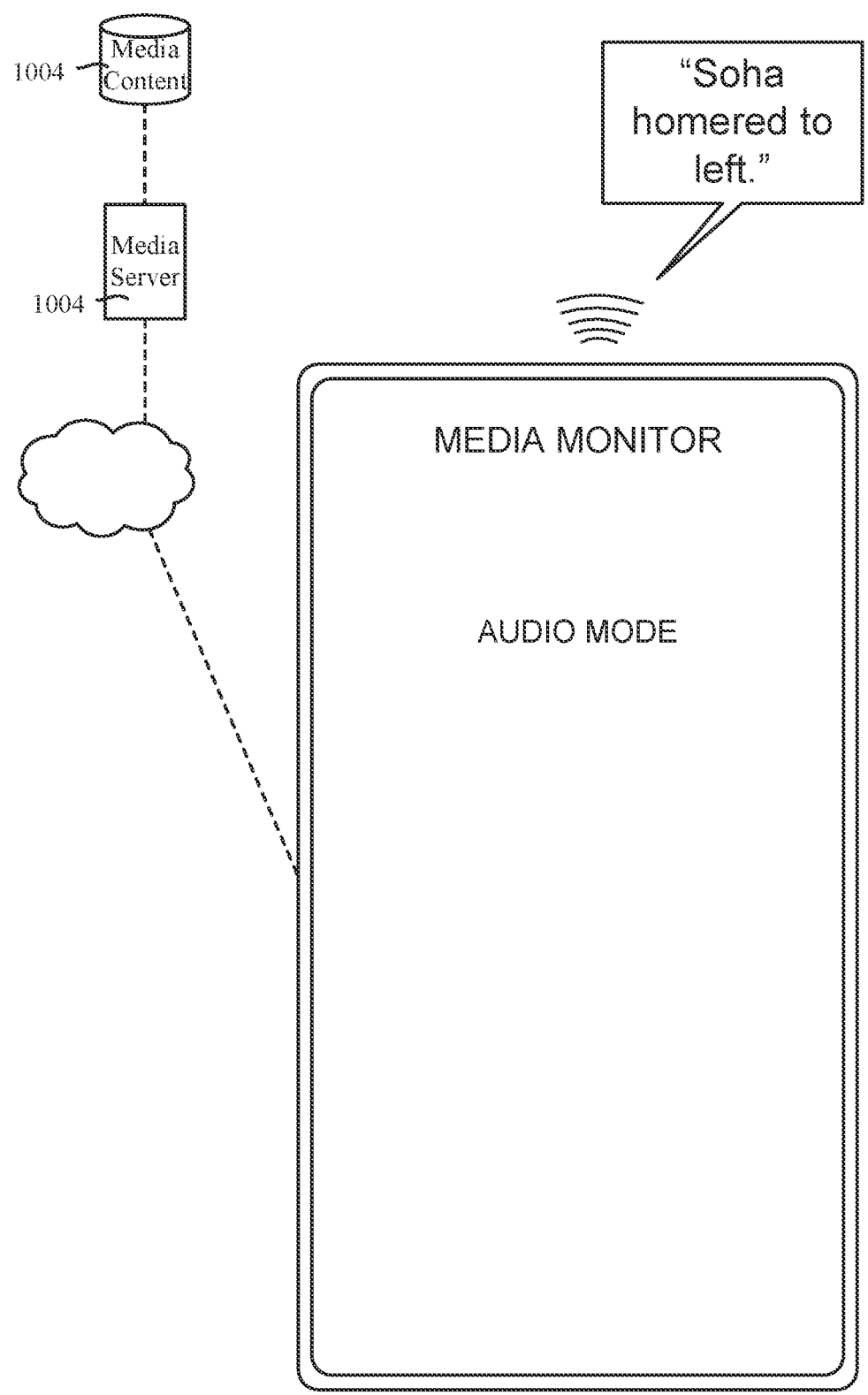
FIG. 10 is an example representation of switching to present primary media content based on automatic detection of criterion being met in supplementary data, in accordance with various aspects and embodiments of the subject disclosure.

As generally represented in FIG. 10, the media monitor also may be configured to be an audio presenter. In this manner, context-specific content of interest to the user based on their profile preference data may be presented as audio alerts. Although not explicitly shown in FIG. 10, it is understood that the same display 990 as in FIG. 9 can be presented in conjunction with audio alerting. In the event of simultaneous audio alerts for different monitored streams, one alert can be presented after the other one completes, possibly with a different voice or the like, which can be based on some tiebreaking scheme.

While the user is viewing media content, the user's attentiveness may be monitored by the monitoring device 112 (FIG. 1) or the like. For instance, the monitoring device 112 may determine that the user has fallen asleep via biometric sensor data analysis. Alternatively, the communication device 110 may determine that the user has been inattentive to the media display, for instance, if the user is using the communication device for other purposes or has been detected to be looking at it by the communication device itself using a camera on the device (or a camera of the presentation device 106). In any event, the user may be determined to have been inattentive to the media content presentation. In this case, the monitoring device 112 and/or communication device 110 may communicate with the media monitor application program 114 to notify the media server 102 of the user's inattentiveness and invoke media monitoring. If the user starts becoming attentive, the user can use the supplementary data to catch up on what had occurred, such as to figure out what led up to the current scene being presented. In this case, (as in other scenarios), the media monitor may present the supplementary data for the same media that is being presented on the media presentation device 106.

Figure 11:
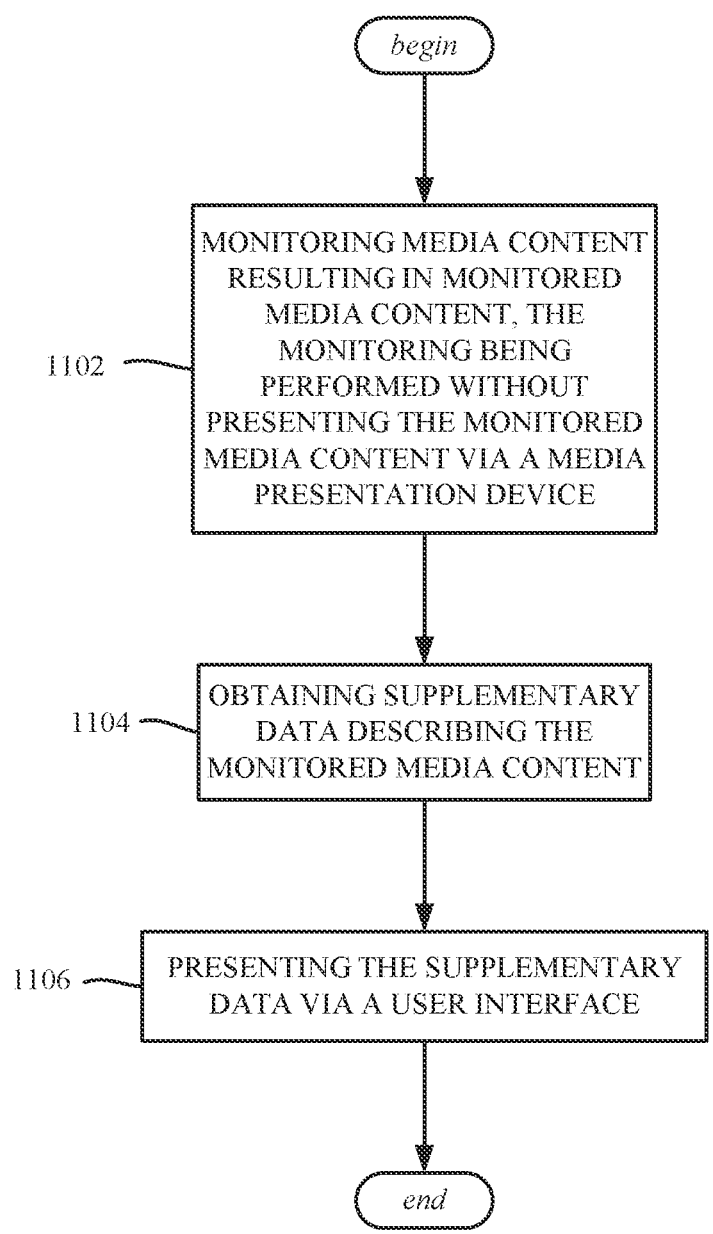
FIG. 11 is a flow diagram representing example operations related to obtaining supplementary data describing monitored media content and presenting the supplementary data, in accordance with various aspects and embodiments of the subject disclosure.

One or more example aspects are represented in FIG. 11, and can correspond to a system, including a processor, and a memory that stores executable instructions that, when executed by the processor, facilitate performance of operations. Example operation 1102 represents monitoring media content resulting in monitored media content, the monitoring being performed without presenting the monitored media content via a media presentation device. Example operation 1104 represents obtaining supplementary data describing the monitored media content. Example operation 1106 represents presenting the supplementary data via a user interface.

The monitored media content can be secondary media content, and further operations can include presenting primary media content via the media presentation device.

Presenting the supplementary data can include presenting the supplementary data via the media presentation device.

Further operations can include based on user input via an interactive interface of the user interface, switching from presenting the primary media content via the media presentation device to presenting the secondary media content via the media presentation device. The supplementary data can be first supplementary data, and further operations can include detecting interaction with the interactive interface, and in response to the detecting, switching from presenting the primary media content via the media presentation device to presenting the secondary media content via the media presentation device, monitoring the primary media content to obtain second supplementary data, and presenting the second supplementary data without presenting the primary media content via the media presentation device.

The media presentation device can be a first media presentation device, the monitored media content can include secondary media content, presenting the supplementary data can include presenting the supplementary data via a second media presentation device, and further operations can include presenting primary media content via the first media presentation device.

The monitored media content can include media content presented via the media presentation device. The monitored media content can include at least one of: previously presented media content, or to be presented media content.

Monitoring the media content can include determining whether the monitored media content is relevant to the user based on relevance criterion data representative of a relevance criterion, and presenting the supplementary data can occur in response to the monitored media content satisfying the relevance criterion.

Monitoring the media content can include identifying scenes of the primary media content, obtaining the supplementary data comprises can include scene summary data describing the scenes of the monitored media content, and presenting the supplementary data can include presenting the scene summary data.

Presenting the supplementary data to the user can include outputting at least one of: audio data, text data, graphics data, file data or image data.

The monitored media content can be secondary media content, wherein the supplementary data can be first supplementary data, and further operations can include presenting primary media content via the media presentation device, wherein the user interface comprises an interactive interface that outputs the supplementary data and allows for interaction to switch from presenting the primary media content via the media presentation device to presenting the secondary media content via the media presentation device, detecting user input via interaction with the interactive interface that selects a portion of the supplementary data, resulting in a selected portion of the supplementary data, and, in response to the detecting, switching from presenting the primary media content via the media presentation device to presenting the secondary media content via the media presentation device from an output position corresponding to the selected portion of the supplementary data.

Further operations can include evaluating, via data from a monitoring device, user attentiveness data, and in response to determining that the user attentiveness data indicates user inattentiveness, communicating with a program to take action based on the user inattentiveness.

Figure 12:
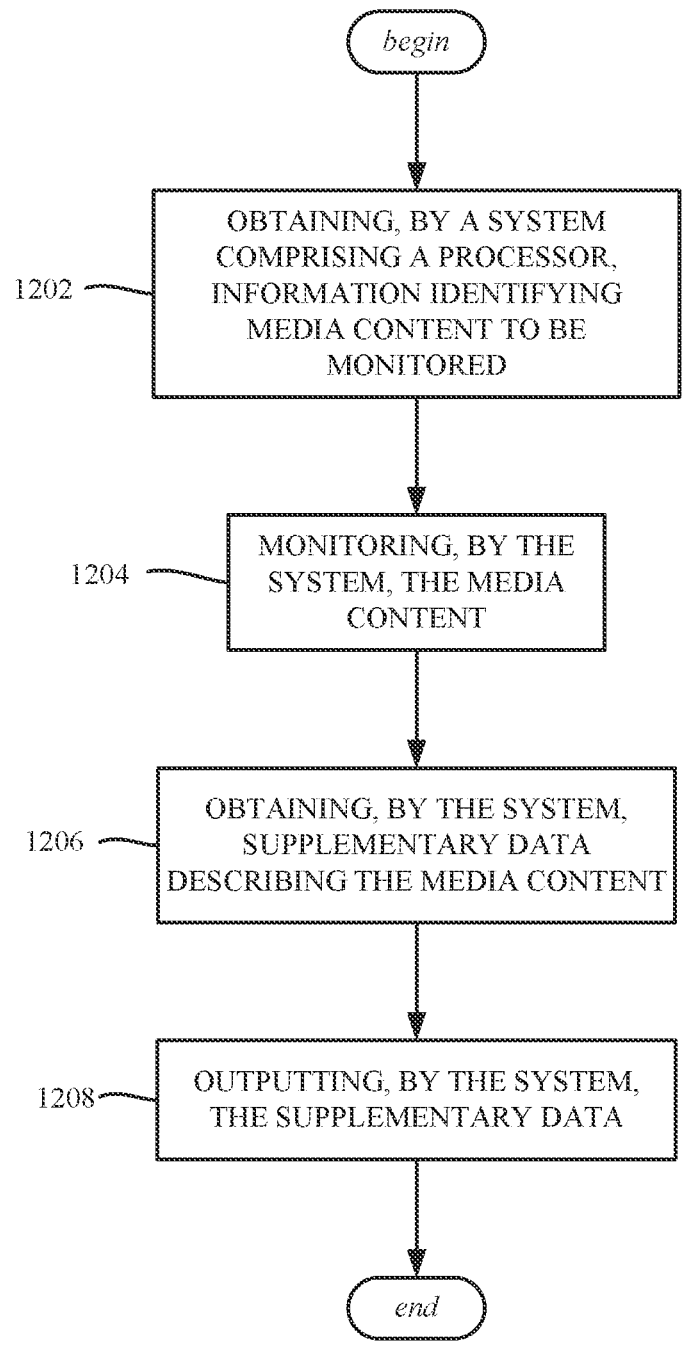
FIG. 12 is a flow diagram representing example operations related to outputting supplementary data describing monitored media content, in accordance with various aspects and embodiments of the subject disclosure.

One or more example aspects are represented in FIG. 12, and, for example, can correspond to operations, such as of a method. Example operation 1202 represents obtaining, by a system comprising a processor, information identifying media content to be monitored. Example operation 1204 represents monitoring, by the system, the media content. Example operation 1206 represents obtaining, by the system, supplementary data describing the media content. Example operation 1208 represents outputting, by the system, the supplementary data.

Monitoring the media content can include determining that the media content satisfies preference criterion data, and outputting the supplementary data can occur in response to the determining.

The media content to be monitored can include first media content, and further operations can include presenting second media content via a media presentation device. The media content to be monitored can include first media content, and outputting the supplementary data can include presenting the supplementary data in conjunction with presenting the second media content.

Figure 13:
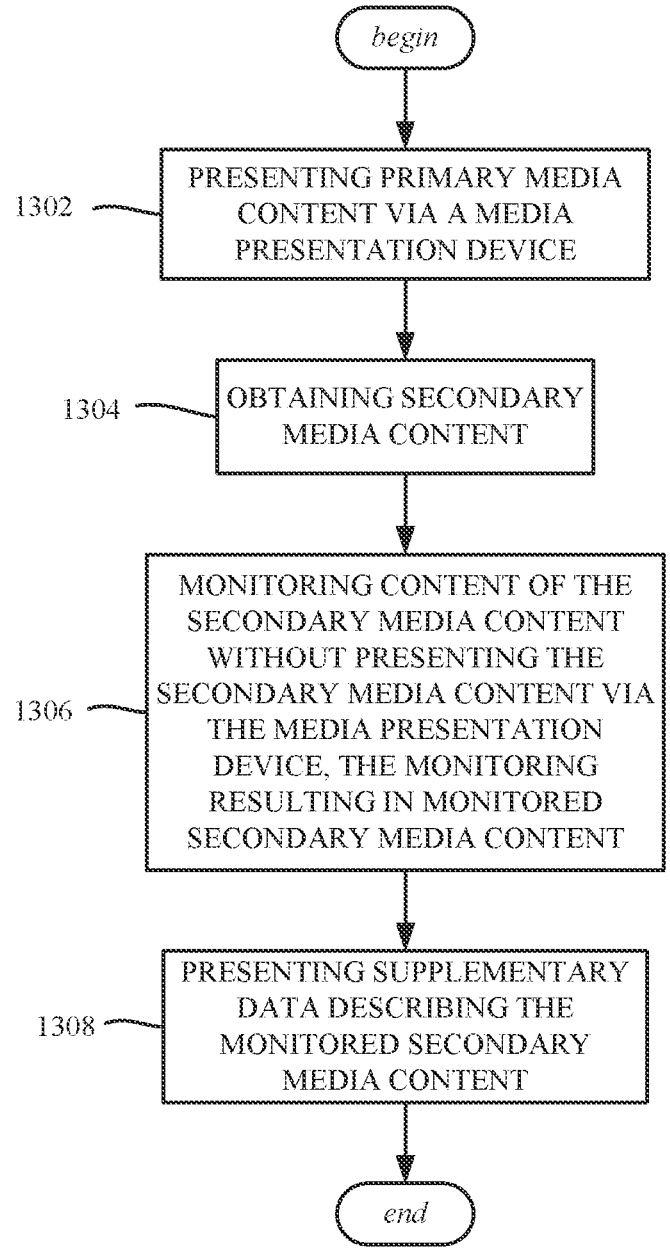
FIG. 13 is a flow diagram representing example operations related to presenting primary media content and outputting supplementary data describing monitored media content, in accordance with various aspects and embodiments of the subject disclosure.

One or more aspects are represented in FIG. 13, such as implemented in a machine-readable medium, including executable instructions that, when executed by a processor, facilitate performance of operations. Example operation 1302 represents presenting primary media content via a media presentation device. Example operation 1304 represents obtaining secondary media content. Example operation 1306 represents monitoring content of the secondary media content without presenting the secondary media content via the media presentation device, the monitoring resulting in monitored secondary media content. Example operation 1308 represents presenting supplementary data describing the monitored secondary media content.

Presenting the supplementary data can include outputting the supplementary data to the media presentation device.

The media presentation device can be a first media presentation device, and wherein presenting the supplementary data can include outputting the supplementary data to a second media presentation device.

As can be seen, the technology described herein facilitates monitoring of media content presentations via supplementary data generated from the media content. The supplementary data can be output in any of various ways for consumption by a user. The monitoring can be based on relevant supplementary data, based on user-specified relevance criteria.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 14:
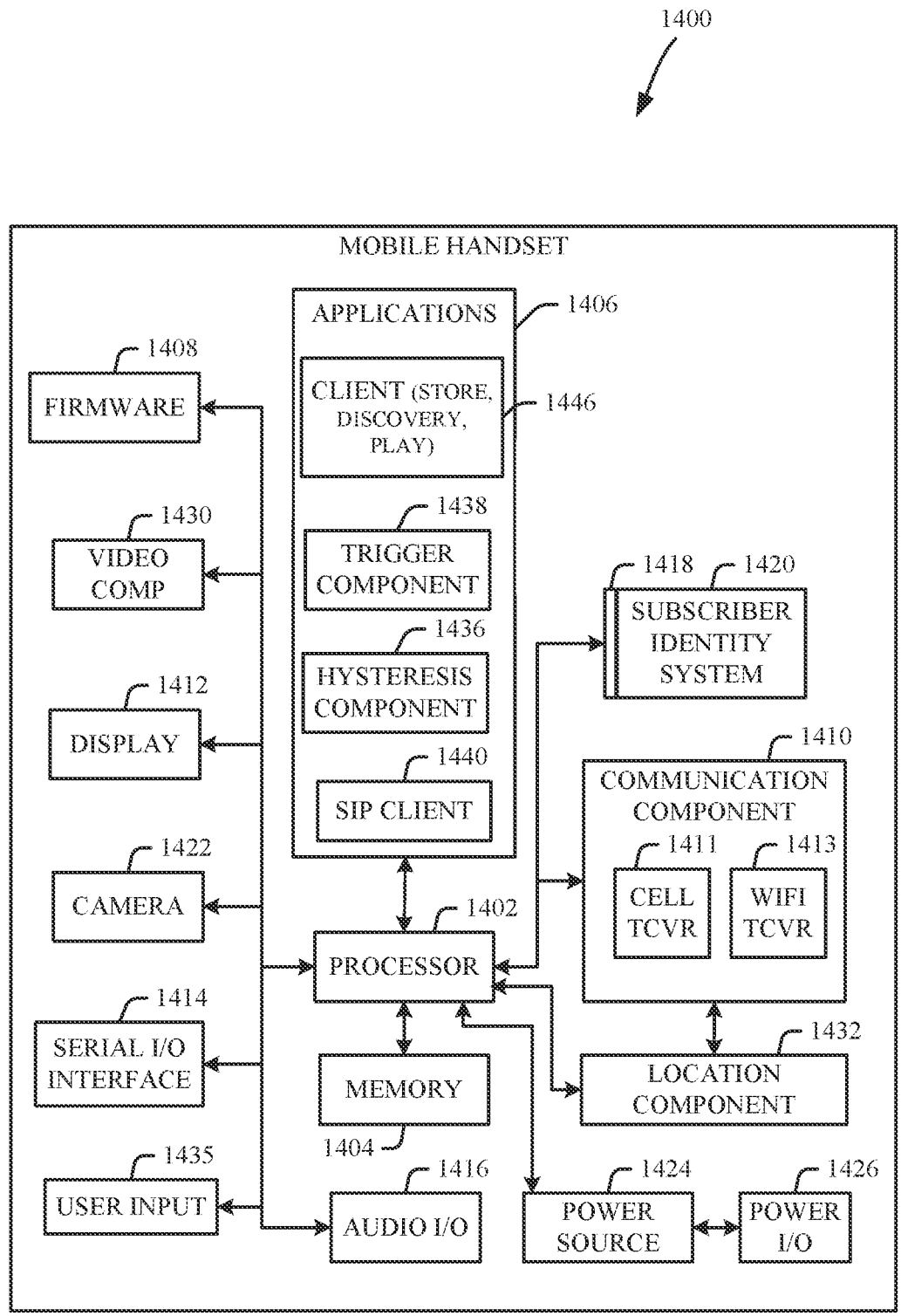
FIG. 14 illustrates an example block diagram of an example mobile handset operable to engage in a system architecture that facilitates wireless communications according to one or more embodiments described herein.

Referring now to FIG. 14, illustrated is a schematic block diagram of an example end-user device (such as user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hard-wire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
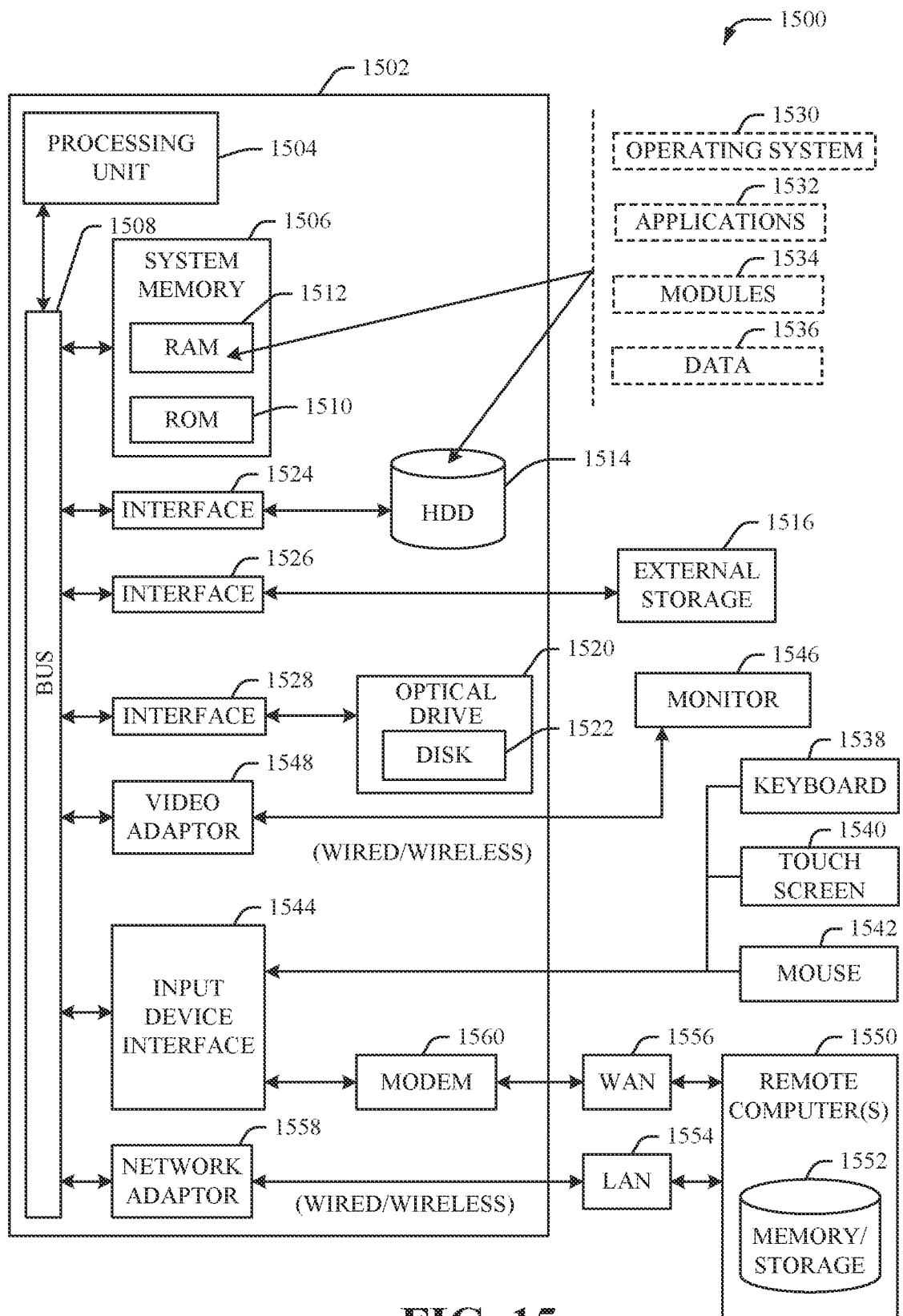
FIG. 15 illustrates an example block diagram of an example computer/machine system operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD), non-volatile memory and other storage technology could be used in addition to, or in place of, an HDD 1514, and can be internal or external. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 15 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   obtaining, by a system comprising a processor, information identifying first media content and second media content to be monitored during a presentation at a first media presentation device; and
   responsive to the obtaining the information identifying the first media content and the second media content to be monitored:
      monitoring, by the system, the first media content and the second media content;
      obtaining, by the system, first supplementary data describing the first media content and second supplementary data describing the second media content;
      obtaining, by the system, first relevance criteria and second relevance criteria for a user;
      determining, by the system, first relevant supplementary data from the first supplementary data, wherein the first relevant supplementary data comprises the first supplementary data that satisfies the first relevance criteria;
      determining, by the system, second relevant supplementary data from the second supplementary data, wherein the second relevant supplementary data comprises the second supplementary data that satisfies the second relevance criteria; and
      outputting, by the system, a first audio alert representing the first relevant supplementary data to a second media presentation device and a second audio alert representing the second relevant supplementary data to the second media presentation device, wherein the first audio alert is audibly distinguishable from the second audio alert, wherein the first audio alert utilizes a different voice than the second audio alert and wherein the second media presentation device comprises a smart phone.

2. The method of claim 1, wherein the first relevant supplementary data is based on closed captioning content.

3. The method of claim 1, wherein the first relevance criteria and the second relevance criteria are obtained from profile preference data for the user.

4. The method of claim 1, wherein the second audio alert is presented at the second media presentation device after the first audio alert is presented at the second media presentation device according to a priority policy for audio alerting.

5. A non-transitory machine-readable medium, comprising executable instructions that, when executed by a processor, facilitate performance of operations, the operations comprising:
obtaining information identifying first media content and second media content to be monitored during a presentation at a first media presentation device; and
responsive to the obtaining the information identifying the first media content and the second media content to be monitored:
monitoring the first media content and the second media content;
obtaining first supplementary data describing the first media content and second supplementary data describing the second media content;
obtaining first relevance criteria and second relevance criteria for a user;
determining first relevant supplementary data from the first supplementary data, wherein the first relevant supplementary data comprises the first supplementary data that satisfies the first relevance criteria;
determining second relevant supplementary data from the second supplementary data, wherein the second relevant supplementary data comprises the second supplementary data that satisfies the second relevance criteria; and
outputting a first audio alert representing the first relevant supplementary data to a second media presentation device and a second audio alert representing the second relevant supplementary data to the second media presentation device, wherein the first audio alert is audibly distinguishable from the second audio alert, wherein the first audio alert utilizes a different voice than the second audio alert, and wherein the second media presentation device comprises a smart phone.

6. The non-transitory machine-readable medium of claim 5, wherein the first relevant supplementary data is based on closed captioning content.

7. The non-transitory machine-readable medium of claim 5, wherein the second audio alert is presented at the second media presentation device after the first audio alert is presented at the second media presentation device according to a priority policy for audio alerting.

8. A system, comprising:
a processor; and
a memory that stores executable instructions that, when executed by the processor of the system, facilitate performance of operations, the operations comprising:
obtaining information identifying first media content and second media content to be monitored during a presentation at a first media presentation device; and
responsive to the obtaining the information identifying the first media content and the second media content to be monitored:
monitoring the first media content and the second media content;
obtaining first supplementary data describing the first media content and second supplementary data describing the second media content;
obtaining first relevance criteria and second relevance criteria for a user;
determining first relevant supplementary data from the first supplementary data, wherein the first relevant supplementary data comprises the first supplementary data that satisfies the first relevance criteria;
determining second relevant supplementary data from the second supplementary data, wherein the second relevant supplementary data comprises the second supplementary data that satisfies the second relevance criteria; and
outputting a first audio alert representing the first relevant supplementary data to a second media presentation device and a second audio alert representing the second relevant supplementary data to the second media presentation device, wherein the first audio alert is audibly distinguishable from the second audio alert, wherein the first audio alert utilizes a different voice than the second audio alert, and wherein the second media presentation device comprises a smart phone.

* * * * *